United States Patent Office 3,595,891
Patented July 27, 1971

3,595,891
PROCESS FOR HYDROCARBON SOLUBLE METAL SALTS
Stanley Bruce Cavitt, Austin, Tex., assignor to Jefferson Chemical Company, Inc., Houston, Tex.
No Drawing. Filed Sept. 17, 1969, Ser. No. 858,861
Int. Cl. C07f *9/00, 11/00*
U.S. Cl. 260—429
8 Claims

ABSTRACT OF THE DISCLOSURE

Hydrocarbon-soluble organic metal salts of molybdenum, tungsten and vanadium are prepared by reacting the inorganic metal oxide or acid of molybdenum, tungsten or vanadium with a liquid alkoxyacetic acid to form an organic-soluble intermediate and then reacting the intermediate with a carboxylic acid. The compounds prepared by the process of this invention are useful as catalysts for the epoxidation of olefins, as lubricant additives, or as metal plating agents.

BACKGROUND OF THE INVENTION

Field of the invention

The invention pertains to the chemical field and the synthesis of organic metal salts.

Description of the prior art

The preparation of organic metal salts of molybdenum, tungsten or vanadium which are soluble in a hydrocarbon medium is extremely difficult. U.S. Pat. 3,362,972 to John Kollar Wallington (1968) discloses a process for the preparation of hydrocarbon-soluble organic molybdenum and vanadium salts by heating mixtures of molybdenum oxide or vanadium oxide, water and oxalic acid dihydrate with an excess of a carboxylic acid. The Wallington process involves a three-phase system of oxalic acid dihydrate which is a solid and two liquid phases of water and acid. My process is a two-phase system which renders an improved, faster and easier reaction without the use of water. Eliminating the necessity for using water also eliminates the three-phase system of the prior art.

SUMMARY OF THE INVENTION

Hydrocarbon-soluble organic metal salts of molybdenum, tungsten and vanadium are prepared by heating the metal oxide or acid of molybdenum, tungsten or vanadium with a liquid alkoxyacetic acid to form an organic-soluble metal intermediate. The intermediate is then reacted with the desired carboxylic acid to form the organic metal salt of the invention.

DESCRIPTION OF THE PREFERRED EMBODIMENTS

The following examples illustrate my invention in more detail but are not intended to limit the scope of the invention. Examples 1, 2 and 3 illustrate several variations of the process of my invention. Example 4 illustrates the utility of a metal salt prepared by my process as a catalyst for the epoxidation of propylene to propylene oxide.

EXAMPLE 1

This example illustrates the synthesis of molybdenum naphthenate. Thirty-five g. of molybdic acid (equivalent to 29.7 g. $MoO_3$) and 74 g. of methoxyacetic acid were added to a 2000 ml., 3-necked Morton flask equipped with a stirrer, thermometer, Dean-Stark trap,, and condenser. The mixture was heated to 150° C.; during this heating period, the salt dissolved and a finely divided, buff-colored solid began to form. At this point, 400 g. of a distilled naphthenic acid fraction, B.P. 67–167° C./2 mm., was added and the reaction mixture was slowly heated to 200° C. Near the latter temperature, a non-homogeneous boiling mixture began to distill and the pot contents began to turn to a uniform dark color. By the time the temperature had risen to 230° C., the pot contents were very dark and appeared to be nearly homogeneous. Rapid distillation of two overhead phases occurred between 230° and 250° C.; distillation slowed noticeably around 250° C. There was recovered a total of 77 ml. of liquid overhead, 55 ml. of which was in the lower layer. The pot contents were cooled to 90° C. and poured into a wide-mouth jar. All of the small quantity of brown residue in the flask was soluble in acetone. There was obtained 406 g. of viscous, purple-brown molybdenum naphthenate which analyzed, by atomic absorption spectroscopy, 3.93 wt. percent molybdenum.

EXAMPLE 2

This example illustrates the synthesis of molybdenum 2-ethylhexoate. The procedure of Example 1 was employed, except 70 g. of molybdic acid (85.1% $MoO_3$), 148 g. methoxyacetic acid, and 500 g. 2-ethylhexanoic acid were employed. Heating was carried out at 200–220° C. for four hours, during which time the initally formed blue solid dissolved to give a dark, reddish brown solution. Approximately 150 ml. of liquid was distilled out of the mixture under aspirator vacuum to remove the methoxyacetic acid. The solution was cooled to 100° C., and approximately 200 ml. of cumene was added. The solution was readily soluble in the cumene. The dark solution was filtered to give 463 g. of molybdenum 2-ethylhexoate which analyzed, by atomic absorption analysis, 5.25 wt. percent molybdenum.

EXAMPLE 3

This example illustrates the synthesis of vanadium naphthenate. Thirty g. of vanadic acid and 88 g. of ethoxyacetic acid were added to a one-liter, 3-necked Morton flask equipped with a stirred, thermometer, condenser and Dean-Stark trap. The mixture was heated to about 120° C. with stirring, then 400 g. of refined naphthenic acid was added. The mixture was heated to about 150° C. and held at that temperature for one hour, then heated to 200° C. and held there for one hour. Some light materials of the reaction mixture, including water, distilled into the water trap and were removed. Toward then end of the last heating period about 100 ml. of light materials were used to slurry and pack filter aid for filtration. A total of 402 g. of dark green, nearly homogenous vanadium naphthenate solution was recovered. A sample of unfiltered material analyzed 3.3 wt. percent vanadium, whereas a filtered sample analyzed 3.1 wt. percent.

EXAMPLE 4

This example illustrates the expoxidation of propylene using molybdenum naphthenate prepared by the methoxyacetic acid method of Example 1, supra. To a one-liter stirred autoclave was added a solution of 76 g. t-butyl alcohol and 2.4 g. of 3.8% molybdenum as molybdenum naphthenate. The autoclave was flushed twice with nitrogen and a mixture of 93 g. cumene hydroperoxide and 257 g. propylene was added. The autoclave and contents were heated to 90° C. and held at this temperature for one hour. After cooling, the light materials were vented into a Dry Ice-acetone condenser and receiver containing 100 g. of cumene. The propylene was then flashed from the light materials through a series of Dry Ice-acetone condensers. The stripped light materials were then added to the heavier reactor effluent from the autoclave. The propylene oxide yield was 57 mol percent of theory based on a hydroperoxide conversion of 93 mol percent.

Comparable results to those illustrated in the examples, supra, are obtained when organic metal salts of molybdenum, tungsten and vanadium not illustrated are prepared by reacting the metal oxide or acid of molybdenum, tungsten or vanadium with a liquid alkoxyacetic acid to form an organic-soluble intermediate and then reacting the intermediate with an organic-soluble intermediate and then reacting the intermediate with a carboxylic acid. Examples of alkoxy-acetic acids suitable for use in my process are methoxyacetic acid, ethoxyacetic acid, propoxyacetic acid, butoxyacetic acid, etc. Examples of the carboxylic acids suitable for use in my process are naphthenic acid, 2-ethylhexanoic acid, hexanoic acid, etc.

The molar ratio of metal oxide or acid to alkoxyacetic acid can vary from about 1:10 to 10:1; however, a molar ratio of about 1:1 to 4:1 is preferred. The molar concentration of the carboxylic acid used should be in such excess over the metal oxide or acid originally charged so that the metal concentration of the final solution is between a range of about 2% and 10%, preferably between 3% and 6%.

The temperatures of the reaction are within the range of about 100°–250° C., preferably about 150°–250° C.

Having thus described my invention, I claim:

1. A process for preparing a hydrocarbon-soluble metal organic salt of molybdenum, tungsten or vanadium which comprises
   heating the inorganic metal oxide or acid of molybdenum, tungsten or vanadium with a liquid alkoxyacetic acid to form an organic-soluble intermediate and then
   heating the intermediate with a carboxylic acid.

2. A process according to claim 1 wherein the alkoxyacetic acid is methoxyacetic acid, ethoxyacetic acid, propoxyacetic acid or butoxyacetic acid.

3. A process according to claim 2 wherein the metal acid is molybdic acid.

4. A process according to claim 3 wherein the molybdic acid is heated with methoxyacetic acid and the resulting intermediate is heated with the carboxylic acid, naphthenic acid or 2-ethylhexanoic acid.

5. A process according to claim 4 wherein the carboxylic acid is naphthenic acid, the temperature is within the range of about 150 C. to about 250° C., the molar ratio of molybdic acid to methoxyacetic acid is about 4:1 to 1:1, and the concentration of molybdenum in the final solution is about 3% to 6%.

6. A process according to claim 4 wherein the carboxylic acid is 2-ethylhexanoic acid, the temperature is within the range of about 150° C. to about 250° C., the molar ratio of molybdic acid to methoxyacetic acid is about 4:1 to 1:1, and the concentration of molybdenum in the final solution is about 3% to 6%.

7. A process according to claim 2 wherein the metal acid is vanadic acid.

8. A process according to claim 7 wherein the vanadic acid is heated with ethoxyacetic acid and the resulting intermediate is heated with naphthenic acid wherein the temperature is within the range of about 150° C. to about 250° C., the molar ratio of vanadic acid to ethoxyacetic acid is about 4:1 to 1:1 and the concentration of vanadium in the final solution is about 3% to 6%.

References Cited

UNITED STATES PATENTS 3,362,972   1/1968   Kollar _____ 260—414

OTHER REFERENCES

Brauer et al.: J. Dental Research, vol. 37 (1958), pp. 547–560.

TOBIAS E. LEVOW, Primary Examiner

A. P. DEMERS, Assistant Examiner

U.S. Cl. X.R.

252—431; 260—348.5